(12) United States Patent
Ranjan et al.

(10) Patent No.: US 11,172,366 B2
(45) Date of Patent: Nov. 9, 2021

(54) EDGE-NODE AUTHENTICATION-DATA EXCHANGE SYSTEM

(71) Applicant: Bank of America Corporation, Charlotte, NC (US)

(72) Inventors: Prabhat Ranjan, Plano, TX (US); William August Stahlhut, The Colony, TX (US); John Ryan Bowling, Moorseville, NC (US)

(73) Assignee: Bank of America Corporation, Charlotte, NC (US)

( * ) Notice: Subject to any disclaimer, the term of this patent is extended or adjusted under 35 U.S.C. 154(b) by 307 days.

(21) Appl. No.: 16/446,775

(22) Filed: Jun. 20, 2019

(65) Prior Publication Data

US 2020/0404485 A1    Dec. 24, 2020

(51) Int. Cl.
*H04W 12/50*    (2021.01)
*H04W 12/06*    (2021.01)
*H04L 29/06*    (2006.01)

(52) U.S. Cl.
CPC ............ *H04W 12/50* (2021.01); *H04L 63/08* (2013.01); *H04W 12/06* (2013.01)

(58) Field of Classification Search
CPC ........ H04W 12/06; H04W 12/50; H04L 63/08
USPC .......................................................... 726/3
See application file for complete search history.

(56) References Cited

U.S. PATENT DOCUMENTS

| | | | |
|---|---|---|---|
| 7,539,856 B2 | 5/2009 | Buch et al. | |
| 8,243,596 B2 | 8/2012 | Fedders et al. | |
| 8,244,874 B1 | 8/2012 | Thireault | |
| 9,900,725 B2 | 2/2018 | Young et al. | |
| 10,104,672 B2 | 10/2018 | Shah | |
| 10,872,142 B1* | 12/2020 | Sharma | H04L 63/08 |
| 2018/0121891 A1 | 5/2018 | Hosny et al. | |

(Continued)

OTHER PUBLICATIONS

Mary Shacklett, "Edge Computing: A Cheat Sheet," https://www.techrepublic.com/article/edge-computing-the-smart-persons-guide/, Jul. 21, 2017.

(Continued)

*Primary Examiner* — Benjamin A Kaplan
(74) *Attorney, Agent, or Firm* — Weiss & Arons LLP; Michael A. Springs, Esq.

(57) ABSTRACT

A system for exchanging authentication data between edge-nodes is provided. The system may include an edge-node network. The network may include a plurality of edge-nodes. Each edge-node may include a pairing module. Each pairing module may receive an instruction to pair with another edge-node. Each pairing module pair with another edge-node. The pairing module may continually transmit verification communications to other edge-nodes. The pairing module may continually discover responsive communications from other edge-nodes. The pairing module may continually receive responsive verification communications from other edge-nodes. Each edge-node may include an executable module. The executable module may determine occurrence of an event. Upon determination of the occurrence of an event, the executable module may analyze a stored event protocol. The protocol including an algorithm for implementing executables in response to an event. The executable module may determine an executable based on the algorithm, and execute the determined executable.

18 Claims, 7 Drawing Sheets

(56) References Cited

U.S. PATENT DOCUMENTS

2018/0167445 A1   6/2018  Speight et al.
2018/0302416 A1\*  10/2018  Einberg .............. H04L 63/0861
2018/0367314 A1  12/2018  Egner et al.
2019/0020657 A1   1/2019  Egner et al.
2019/0026450 A1   1/2019  Egner et al.
2019/0268310 A1\*  8/2019  Guberman .............. H04L 67/12

OTHER PUBLICATIONS

Paul Miller, "What is Edge Computing?" https://www.theverge.com/circuitbreaker/2018/5/7/17327584/edge-computing-cloud-google, May 7, 2018.
"What is Edge Computing," https://www.ge.com/digital/blog/what-edge-computing, GE Digital, Retrieved on May 16, 2019.

\* cited by examiner

EDGE-NODE AUTHENTICATION-DATA EXCHANGE SYSTEM

FIELD OF TECHNOLOGY

This disclosure relates to edge computing. Specifically, this disclosure relates to authentication using edge computing devices.

BACKGROUND OF THE DISCLOSURE

Typical computing devices include personal, proprietary and/or confidential data. Keys to accessing the personal, proprietary and/or confidential data stored on computing devices are authentication methods used to identify and authenticate a user prior to allowing the user to access the contents of the device. Because the contents of the device may be valuable, devices involve various user authentication methods. The level of user authentication may be based on the confidentiality of the data stored on the device.

Typical device authentication involves data entry, such as username and password. Other, more-complex, device authentication methods include two-step authentication, biometric authentication, gesture authentication and/or a combination of the above. These authentication methods are stronger than data entry. However, because the authentication is executed from a single device, the device may still be vulnerable to a person of malicious intent who obtains possession of the device.

Therefore, it may be desirable to authenticate a user using multiple paired devices or nodes. It may further be desirable for the devices, or nodes, to share, and, at times, rely on authentication data with, or from, one another. It may be further desirable for the devices to trigger an alert when the paired authenticated devices are separated.

SUMMARY OF THE DISCLOSURE

A method for exchanging authentication data between edge-nodes is provided. An edge-node may be a node on the periphery or edge of a network.

Each edge-node may include authentication data. The authentication data may be transmitted to other edge-nodes within the network. Illustrative examples of authentication data may include a username and password combination, fingerprint data, iris scan data, other biometric data and any other suitable authentication data. In some embodiments, authentication data may include minimal authentication data, such as an edge-node identifier and an authentication status—e.g., whether the edge-node is authenticated. The communication of authentication data between edge-nodes may effectively secure the network, and the individual edge-nodes on the network, as will be described below.

The method may include pairing a first edge-node with a second edge-node. The pairing may be implemented using wireless communication technology. Such technology may include near field communication ("NFC"), Bluetooth® communication, WIFI communication, Beacon® communication and other suitable wired or wireless communication.

In some embodiments, the pairing may be initiated by the first edge-node or the second edge-node. The pairing may include transmitting an initiating communication from a first edge-node to a second edge-node. The initiating communication may include a request to pair nodes. The second edge-node may respond to the initiating communication by setting a pairing setting in order to accept the initiating communication and/or accepting the initiating communication. There may be various other suitable methods for pairing edge-nodes. For example, the second edge-node may be set to a discover status. The discover status may enable the second edge-node to automatically respond to the initiating communication absent any human intervention.

Upon pairing, each paired edge-node may continually and/or periodically transmit a verification communication to the other edge-node. A verification communication may be a communication that verifies the existence, location and/or operability of the other edge-node. Each paired edge-node may expect a responsive verification communication in response to the transmission of the verification communication. Therefore, each edge-node may attempt to discover a responsive verification communication from the paired edge-node. The continual and/or periodic communication between the edge-nodes may ensure that the edge-nodes remain in a paired state.

Because there is continual and/or periodic communication between the paired edge-nodes, a transmitting edge-node may identify when a paired edge-node is unresponsive to a transmitted verification communication. The transmitting edge-node may trigger an alert in response to identification of the unresponsive edge-node. The alert may be an audible alert.

When two or more edge-nodes are paired, the edge-nodes may, continually or periodically exchange authentication data. The authentication data may be used to identify each edge-node. The authentication data may also be used to authenticate a user associated with the paired edge-nodes. The authentication data may be aggregated from each of the paired edge-nodes onto one of the edge-nodes. The aggregated authentication data may be stored on each of the paired edge-nodes. The aggregated authentication data may be used to authenticate an entity associated with the paired edge-nodes. Because the aggregated authentication data may involve the physical presence of multiple edge-nodes, an aggregated authentication may be more secure than a single edge-node authentication.

In some embodiments, pairing and communication between edge-nodes may only be available when the paired nodes are within a predetermined distance of one another. Therefore, in the event that the pair is separated, an alert may be triggered on one or, or both, of the paired edge-nodes. Also, in the event that the pair is separated, the authentication data may become obsolete and/or unavailable. Because the edge-nodes are separated, the user may be unable to use the aggregated authentication method.

In some embodiments, aggregated authentication may be the compulsory authentication method. Therefore, upon triggering an alert at an edge-node, the authenticated applications and/or authenticated communications may be become unavailable and/or go offline until the entity is re-authenticated.

In some embodiments, when an edge-node receives a responsive verification communication in response to transmitting a verification communication, the receipt of the responsive verification communication may be authentication data. The authentication data may authenticate an entity associated with the receiving edge-node. An authenticated entity may be able to access authenticated applications, transmit authenticated communications and perform other suitable authenticated actions.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Systems and methods for exchanging authentication data between edge-nodes are provided.

An edge-node may be a sensor. A sensor may detect changes in attributes of a physical or virtual operating environment. For example, sensors may measure attributes such as audio, rainfall, movement, temperature, water levels or activity of other sensors. Sensors may measure electronic network traffic, customer traffic, resource usage, electronic signals (e.g., input or output) or frequency of user logins within a predefined geographic area.

Nodes may be any suitable size. For example, nodes may be a few millimeters in size. Nodes may be deployed in a wide variety of locations. For example, sensors may be deployed in military battlefields, industrial plants, in orchards, in clothing, automobiles, smartphones, jewelry or refrigerators. Sensors may be relatively inexpensive and have low energy consumption. Sensors may "sense" two or more stimuli or environmental attributes.

Nodes may implement two or more functions. For example, sensors may measure changes in their operating (physical or virtual) environment, capture data corresponding to the measured changes and store/communicate the captured data. Sensors may be accessed by other sensors or other nodes on the network.

A node may be an actuator. For example, based on data captured by a sensor, an actuator may respond to a detected event. Based on the capture and analysis of multiple sources of data (e.g., captured by sensors), an actuator may be instructed to take action autonomously, without human intervention.

Actuators may respond to data transmitted or processed by other nodes. Actuators may include devices that modify the physical state of a physical entity. Actuators may include devices that modify a virtual state of information. Actuators may move (translate, rotate, etc.) physical objects or activate/deactivate functionalities of physical objects. For example, actuators may dim a light bulb, open a door, change a temperature setting and/or any other suitable functionality.

Within an IoT environment, sensor nodes may perform the functions of input devices—they serve as "eyes" collecting information about their native operating environment. In contrast, actuator nodes may act as "hands" implementing decisions based on data captured by the sensor nodes. A single node may include the functions of sensors and actuators.

Nodes may include an application programming interface ("API") for communicating with other nodes. Nodes may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision-making and communication processes for actuators.

Nodes may store captured data locally. For example, nodes may store captured data in on-board transitory and/or non-transitory computer readable media. A node may transmit data. Data captured by a node may be transmitted to another node. A node may transmit data to a network core.

The network core may process the data. For example, multiple sensors may transmit captured data to a cloud computing environment. The cloud computing environment may itself include multiple nodes, such as computer servers or other computer systems. Nodes of the cloud computing environment may be networked to each other.

The cloud computing environment may process data that was captured by other nodes far from the location where the data was generated. For example, captured data may be transmitted from one node to another node until the captured data reaches a centrally located data depository.

Data captured by nodes in an operating environment may be voluminous and complex (e.g., structured/unstructured and/or constantly changing). Traditional data processing application software may be inadequate to meaningfully process the voluminous and complex data (e.g., "big data"). A cloud computing environment may include software applications specially designed to process large volumes of data ("big data analytics").

Nodes may communicate with other nodes directly, without transmitting information to an intermediary node or central server, such as a cloud computing environment. Data may be transmitted by a node using any suitable transmission method. For example, data captured by a node may be transmitted from a smartphone via a cellular network. Nodes may leverage a communication link provided by a smartphone to communicate captured data to other nodes.

As a result of the disparate nature of nodes, a networked operating environment may support a variety of communication protocols. Illustrative supported protocols may include HyperText Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols. For example, ZigBee is particularly useful for low-power transmission and requires approximately 20 to 60 milli-watts ("mW") of power to provide 1 mW transmission power over a range of 10 to 100 meters and a data transmission rate of 250 kilo-bits/second.

To further conserve energy, a node may communicate wirelessly for short periods of time. Utilizing this approach, one or more standard size single cell dry battery batteries (e.g., AA size) may provide a node with requisite computing power and wireless communication for many months.

A physical layer may link nodes within a network. The physical layer may provide data ports and communication pathways to move data between multiple sub-networks and nodes. Such communication pathways may be wired or wireless. Exemplary wireless communication pathways may include Ethernet, Bluetooth, Wi-Fi, 3G, 4G, 5G and any other suitable wired or wireless broadband standards. Illustrative data ports of nodes may include hardware and/or software for receiving and/or transmitting data using any suitable communication pathway.

Each node may be assigned a unique identifier. For example, nodes may be identified by one or more radio frequency identification ("RFID") tags. The RFID tag may be stimulated to transmit identity information about the node or any other information stored on the RFID tag. Nodes may be identified by an Internet Protocol ("IP") address. Nodes may be identified based on a user. For example, a smartphone may be a node identified based on a user that successfully inputs biometric credentials.

Nodes may be positioned in, and capture data from, diverse operating environments. Operating environments may include geographic locations or virtual locations on electronic networks. Captured data may be transmitted to a location where information is needed for decisioning or consumption. Such a location may not be the same location where the data was captured or generated. Data synchronization protocols and caching techniques may be deployed across an IoT network to facilitate transmission of data, or delivery of data to, any desired node.

For example, a location where data is captured may not have continuous, reliable network connectivity. Accordingly, captured data may be stored locally on a node until a network connection is available to transmit or broadcast the captured data to another node.

Nodes may be grouped. Nodes may be grouped based on physical proximity or based on the content (or expected content) of data captured by the sensor. Nodes may be grouped based on detected movement of a node. For example, nodes may be affixed to vehicles or other moveable objects. Such nodes may move in or out of a network. Nodes within a geographic area may be grouped based on their presence within the geographic area. Nodes may be grouped based on their expected trajectory. Nodes may be grouped based on whether they are resource consumer or providers. Nodes may be grouped based on expected resource consumption. Nodes may be grouped virtually. Grouped nodes may form a sub-network.

Contextually, data captured by nodes may provide information not only about the native (physical or virtual) operating environment surrounding a node, but data captured by multiple nodes may provide data that signifies occurrence an event. The data may be analyzed by a cloud computing environment. Analytical tools (e.g., big data analysis techniques) may detect, within the data, occurrence of an event that triggers actuator nodes to take responsive action.

Advances in embedded systems, such as System-on-a-Chip ("SoC") architectures, have fueled development of nodes that are powerful enough themselves to run operating systems and complex data analysis algorithms. An illustrative SoC may include a central processing unit ("CPU"), a graphics processor ("GPU"), memory, power management circuits, and communication circuit. Within an operating environment, such nodes may be positioned closer (relative to the cloud computing environment) to other data gathering nodes such as sensors. Nodes positioned close to the source of generated data and having sufficient computational power to process the data may be termed "edge-nodes." Edge-nodes may integrate sensing capabilities, actuating capabilities, data connectivity and/or computing capacities.

Edge-nodes may control sensors, actuators, embedded devices and other nodes. Edge-nodes, or the nodes they control, may not be continuously connected to a network. Edge-nodes may provide computational resources positioned near the source of captured data or near an operating environment. Processing data using edge-nodes may reduce the communication bandwidth needed to transmit data from a node to a cloud computing environment.

For example, a sensor deployed on a windfarm turbine may detect changes in wind speed or wind direction. Typically, the sensor may transmit the detected changes to a remote cloud computing environment. The remote cloud computing environment may process data received from the node (and other nodes) and issue instructions to adjust a position of the turbine in response to the detected changes. However, communication with, and processing by, the cloud computing environment may inject additional latency before the turbines are adjusted in response to the sensed changes.

By running data analytics and processing closer to the originating source of data, actuator response times may be improved. Edge-nodes embedded in the turbine may include sufficient processing power to analyze sensed data and adjust turbines with less latency (perhaps even in close to real-time) and thereby optimize electricity production of the turbine.

In addition to providing faster response time to sensed changes, processing data using edge-nodes may reduce communication bandwidth requirements and improve overall data transfer time across a network. Furthermore, less frequent data transmissions may enhance security of data gathered by nodes. Frequent data transfers may expose more data to more potential security threats. For example, transmitted data may be vulnerable to being intercepted en-route to the cloud computing environment.

Additionally, edge-nodes may be tasked with decision-making capabilities. Edge-nodes may discard non-essential data generated by sensors. Such disregarded data may never be transmitted or stored in the cloud computing environment, further reducing exposure of such data to security threats.

For example, network of security cameras (e.g., sensor nodes) may generate large amounts of video data. Transmitting such large amounts of data to a cloud computing environment may utilize significant bandwidth—possibly preventing the cloud computing environment from timely receiving other data. Edge-nodes may analyze the video data at the source, before transmitting the data to the cloud computing environment. The analysis by the edge-nodes may identify "important" video data and discard the rest. Only the important video data may be transmitted to the cloud computing environment, reducing network congestion.

Often instructions to actuators need to be issued in milliseconds or faster. Round-trip communication to a cloud computing environment introduces undesirable latency. For some applications, necessary reliability and critical-path control management make it undesirable to wait for the cloud computing environment to process data and issue responsive instructions.

For example, an anti-collision algorithm for an autonomous vehicle may be executed by the cloud computing environment. However, it would be faster and more reliable for such anti-collision algorithms to be run by edge-nodes. Furthermore, the anti-collision data may have short-term value and it would therefore be undesirable to regularly transmit that data to the cloud computing environment.

Some nodes may be deployed in areas with poor network connectivity. For example, industries such as mining, oil/gas, chemicals and shipping may not be well served by robust affordable communication infrastructure. Incorporating edge-nodes may allow networks associated with these industries to process data without robust communication infrastructure.

Smartphones may not have access to a data connection. Edge-nodes may allow a cached version of a website to be opened on a smartphone, without an internet connection. Data may be entered into the website and changes saved locally to the edge-node (e.g., the smartphone itself). The edge-node may synchronize changes with the cloud computing environment when a data connection is available. Aggregated sensor data may be transmitted to the cloud computing environment at designated times, such as when network bandwidth is underutilized.

Utilizing edge-nodes to process data may improve security of a network. For example, a network breach may be detected by an edge-node. The intrusion may be quarantined by or at the edge-node and prevent the breach from compromising the entire network.

Edge-nodes may run encryption algorithms and store biometric information locally. Such dispersion of security protocols may reduce risk of any user's security information being comprised. Utilizing edge-nodes may disperse processing power needed to run the security or encryption algorithms.

Utilizing edge-nodes may improve reliability of a network. For example, edge-nodes with machine learning capabilities may detect operational degradation in nodes, equipment, and infrastructure deployed within an operating environment. Early detected degradation may be cured before developing into full-blown failures.

Generally, edge-nodes may include a processor circuit. The processor circuit may control overall operation of an edge-node and its associated components. A processor circuit may include hardware, such as one or more integrated circuits that form a chipset. The hardware may include digital or analog logic circuitry configured to perform any suitable (e.g., logical) computing operation.

A edge-node may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, computer executable instructions, electronic signatures of biometric features or any other suitable information or data structures. Components of a node may be linked by a system bus, wirelessly or by other suitable interconnections. Edge-node components may be present on one or more circuit boards. In some embodiments, the components may be integrated into a single chip. The chip may be silicon-based.

An edge-node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable an edge-node to perform various functions. For example, the non-transitory memory may store software applications used by an edge-node, such as an operating system, application programs, and an associated database. Alternatively, some or all of computer executable instructions of an edge-node may be embodied in hardware or firmware components of the edge-node.

Software application programs, which may be used by an edge-node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

An edge-node may support establishing network connections to one or more remote nodes. Such remote nodes may be edge-nodes, sensors, actuators or other computing devices. Edge-nodes may be personal computers or servers. An edge-node may communicate with other nodes using a data port. The data port may include a network interface or adapter. The communication circuit may include the modem. The data port may include a communication circuit. An edge-node may include a modem, antenna or other communication circuitry for establishing communications over a network, such as the Internet. The communication circuit may include the network interface or adapter.

Via the data port and associated communication circuitry, an edge-node may access network connections and communication pathways external to the edge-node. Illustrative network connections may include a local area network ("LAN") and a wide area network ("WAN"), and may also include other networks. Illustrative communication pathways may include Wi-Fi, wired connections, Bluetooth, cellular networks, satellite links, radio waves, fiber optic or any other suitable medium for carrying signals.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Edge-nodes may include various other components, such as a display, battery, speaker, and antennas. Edge-nodes may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

An edge-node may include a display constructed using organic light emitting diode ("OLED") technology. OLED technology may enhance functionality of an edge-node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing edge-nodes that consume less power for their basic functionality and allow any residual available power to provide enhanced security and functionality. Illustrative devices that may be constructed using OLED technology are disclosed in commonly assigned U.S. Pat. No. 9,665,818, which is hereby incorporated by reference herein in its entirety.

An edge-node may be, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Edge-nodes may utilize computer-executable instructions, such as program modules, executed by a processor. Software applications may include multiple program modules. Generally, program modules include routines, programs, objects, components, data structures, etc. that perform particular tasks or implement particular abstract data types. An edge-node may be operational with distributed computing environments where tasks are performed by remote processing devices that are linked through a communications network. In a distributed computing environment, program modules may be located in both local and remote computer storage media including memory storage devices. Edge-nodes may interact with a network of remote servers hosted on the Internet to store, manage, and process data (e.g., a cloud computing environment).

Edge-nodes may include a battery. The battery may be a power source for electronic components of the edge-node. For example, the battery may supply power to the display, the communication circuit and the processor circuit. In some embodiments, an edge-node may include a plurality of batteries. Edge-nodes may include solar panels that convert solar energy into electricity that power one or more components of an edge-node.

An edge-node may receive data in real-time or at predefined intervals, such as once a day. The edge-node may filter data captured by one or more nodes. The edge-node may repackage or reformat captured data. Data conversion may include transformation of low level raw data (possibly from multiple sensors or groups of sensors) into meaningful information for a specific audience or for a specific analysis.

For example, captured data intended for human consumption or interaction may be converted into a human understandable format. Captured data intended for machine consumption may be converted into a format readable by a particular machine or node.

An edge-node may perform pattern recognition to identify correlations and trends in captured data. The correlations and trends may indicate expected or current resource consumption. The edge-nodes may redistribute resources based on expected resource usage. The edge-nodes may route resources consumers (e.g., customers) to a location that has available resources to service the consumption.

The edge-node may evaluate a cost of obtaining authentication credentials. "Costs" may be monetary (e.g., labor costs or infrastructure costs), time-related or related to a level of intrusion needed to obtain desired credentials.

"Costs" may be bandwidth-related. For example, a communication pathway may be associated with a fixed bandwidth. A communication pathway may include nodes and network connectivity linking those nodes. The bandwidth may limit an amount of information or a rate of transmission over the communication pathway. As further example, a sensor may respond slowly to a request from another node if there is a large amount of informational traffic traveling on a communication pathway shared with other nodes. The large amount of informational traffic may not leave sufficient bandwidth for the transmitting node to timely communicate with the requesting node.

As a further example, a node may respond slowly if the node transmits a large amount of captured data. If transmitted all at once, the large amount of information transmitted by the node, together with other informational traffic traveling on a shared communication pathway, may be close to, or exceed bandwidth of the communication pathway. As a result, the network may become congested and other nodes on the network may be unable to transmit time-sensitive captured data in a timely manner.

Data travelling within a network to/from nodes may be routed along multiple communication pathways until the transmitted information reaches a desired destination node (e.g., a cloud computing environment). Each communication pathway may service a number of connected nodes and a respective volume of informational traffic.

It may be difficult to ascertain available bandwidth on a particular communication pathway. It may be difficult to ascertain which communication pathways are being utilized to transmit information between nodes. Nodes attempting to transmit information over a communication pathway may not be aware of a number of connected nodes, a volume of traffic on a particular communication pathway or a bandwidth capacity of a communication pathway.

Furthermore, a communication pathway may be controlled by a different entity from an entity responsible for operation of a particular node. The entity responsible for operation of the node may be unable to monitor a number of nodes that share a communication pathway, a bandwidth capacity of a communication pathway or a volume of traffic transmitted on a communication pathway. Edge-node may be configured to manage data transmission of other nodes to reduce network congestion. For example, an edge-node may perform pattern recognition to estimate costs of obtaining data from a node on a network.

Examples of edge-nodes may include mobile devices, tablets, smart watches, security cameras, door bells, payment instruments, cars, glasses, keys and any other suitable edge-node. Each edge-node may include a processor, a sensor, communication capabilities and any other suitable components.

The plurality of edge-nodes may be included on an edge-node network. The edge-node network may be an internet of things ("IoT") network. The network may be associated with one entity. The network may be associated with a plurality of entities.

It should be appreciated that a network that is associated with a plurality of entities may be able to provide a "buddy" system. Each edge-node may be paired to one or more "buddies." In the event that the buddies are separated, one or both edge-nodes may be alerted. This feature may be used to maintain security of entities traveling together. This feature may ensure that one entity is not estranged from a group without an alert.

Each edge-node may include a pairing module. The pairing module may be operable to receive an instruction. The instruction may be to pair a host edge-node with one or more other edge-nodes in the network. It should be appreciated that the term 'host' edge-node may be understood to mean the initiating edge-node on which the pairing module is located. It should be appreciated that each edge-node may be a host edge-node.

The pairing module may receive an instruction to perform any other suitable pairing operation. Such operations may include terminating a pairing between two edge-nodes, refreshing a pairing between two edge-nodes and/or any other suitable operation.

The pairing module may also execute the received instruction. The pairing module may pair the host edge-node with the one or more other edge-nodes in the network. The pairing module on the host edge-node may continually transmit a verification communication to the one or more edge-nodes in the network. The pairing module on the host edge-node may also continually discover a responsive verification communication from the one or more edge-nodes in the network. The pairing module at the host edge-node may continually receive the responsive verification communication from the one or more edge-nodes in the network.

Each edge-node may include an executable module. The executable module may determine the occurrence of an event on the network. The pairing between two edge-nodes may be an event. A pairing event may include the host edge-node being paired with another edge-node. The determination of a paired edge-node that is being unresponsive to the verification communication transmitted by the host edge-node may be an event. The host edge-node requesting authentication may be an event. Another edge-node requesting authentication data from the host edge-node may be an event. Other suitable occurrences may be determined to be events.

Upon the determination and/or identification of the event at the host edge-node, the executable module may analyze a stored event protocol of the host edge-node. Each edge-node may include a stored event protocol. The stored event protocol may include procedural details relating to how to respond to each documented event. The stored event protocol may be standardized. The stored event protocol may be personalized. The stored event protocol may be modifiable by a user of the edge-node.

The stored event protocol may include a list of paired edge-nodes. It should be appreciated that the list of paired edge-nodes may be updated in real-time. The list may also include various details pertaining to each edge-node. The details may include the entity associated with the edge-node, the model of the edge-node, the timestamp of the initial pair time of the edge-node, the timestamp of the most-recently received responsive verification communication from the edge-node and any other suitable details.

The stored event protocol may include an algorithm for implementing one or more executables in response to one or more triggers. The algorithm may be a standard algorithm. The algorithm may be a customized algorithm. The algorithm may be modifiable by an entity associated with the edge-node.

Examples of executables may include activating an alert. Such an alert may be audible alert. The alert may sound when two edge-nodes are no longer in communication with each other. One illustrative example of the use of an alert may include the pairing between a payment instrument and a mobile device. The payment instrument may broadcast an alert when separated from the mobile device. The mobile device may trigger an alert when separated from the payment instrument. Such an alert may be a vibrating alert.

Another example of an executable may include authenticating an edge-node. Authenticating an edge-node may enable transmission of authenticated communications from the edge-node. Authenticating the edge-node may enable access to authenticated applications.

Another example of an executable may include terminating authentication of an edge-node. Terminating authentication of an edge-node may include terminating transmission of authenticated communications and terminating access to authenticated applications.

Examples of triggers may include a pairing between the host edge-node and another edge-node. Another example of a trigger may also include an unresponsive edge-node. An edge-node may be determined to be unresponsive after not responding to a verification communication transmitted by the host edge-node. The edge-node may only be identified as unresponsive after being unresponsive for a predetermined amount of time.

The executable module may determine an executable suitable to manage the event based on the stored event protocol. The executable module may execute the determined executable. In some embodiments, the executable module may request entity permission prior to executing the executable.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
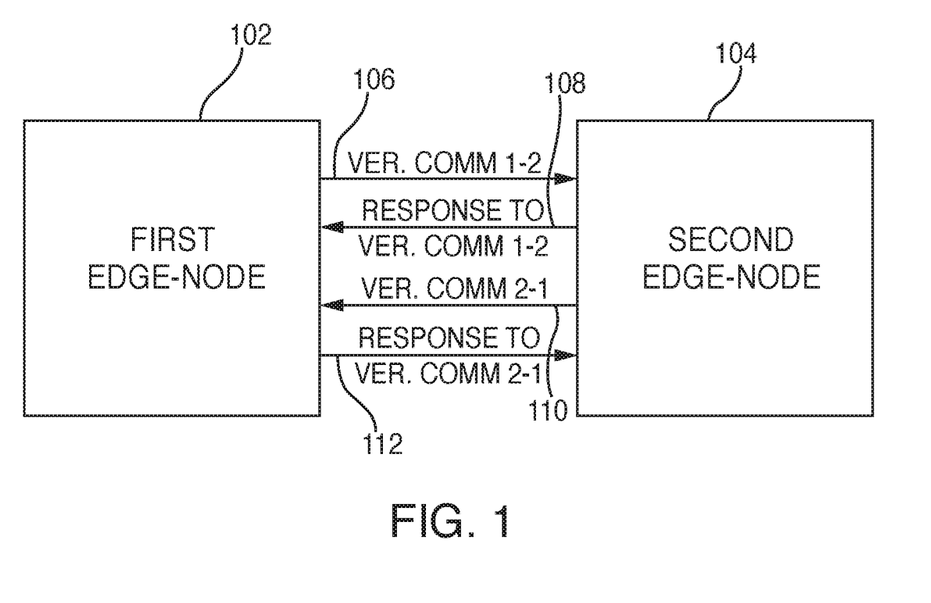
FIG. 1 shows an illustrative diagram in accordance with principles of the disclosure.

FIG. 1 shows an illustrative diagram. First edge-node 102 may be in communication with second edge-node 104. First edge-node 102 may send an initial communication to second edge-node 104. It should be appreciated that, at times, the initial communication may be a verification communication.

Verification communication 106 may be a verification communication initiated by first edge-node 102 and transmitted to second edge-node 104. The representation 1-2 may indicate that the communication is being initiated by the first edge-node (1) and being transmitted to the second edge-node (2).

Second edge-node 104 may respond to verification communication 106 with response to verification communication 108. Communications 106 and 108 may be transmitted continually, periodically, on a predetermined schedule, after a predetermined amount of time or at any other suitable time.

Verification communication 110 may be a verification communication initiated by second edge-node 104 and transmitted to first edge-node 102. The representation 2-1 may indicate that the communication is being initiated by the second edge-node (2) and being transmitted to the first edge-node (1).

First edge-node 102 may respond to verification communication 110 with response to verification communication 112. Communications 110 and 112 may be transmitted continually, periodically, on request, on a predetermined schedule, after a predetermined amount of time or at any other suitable time.

Figure 2:
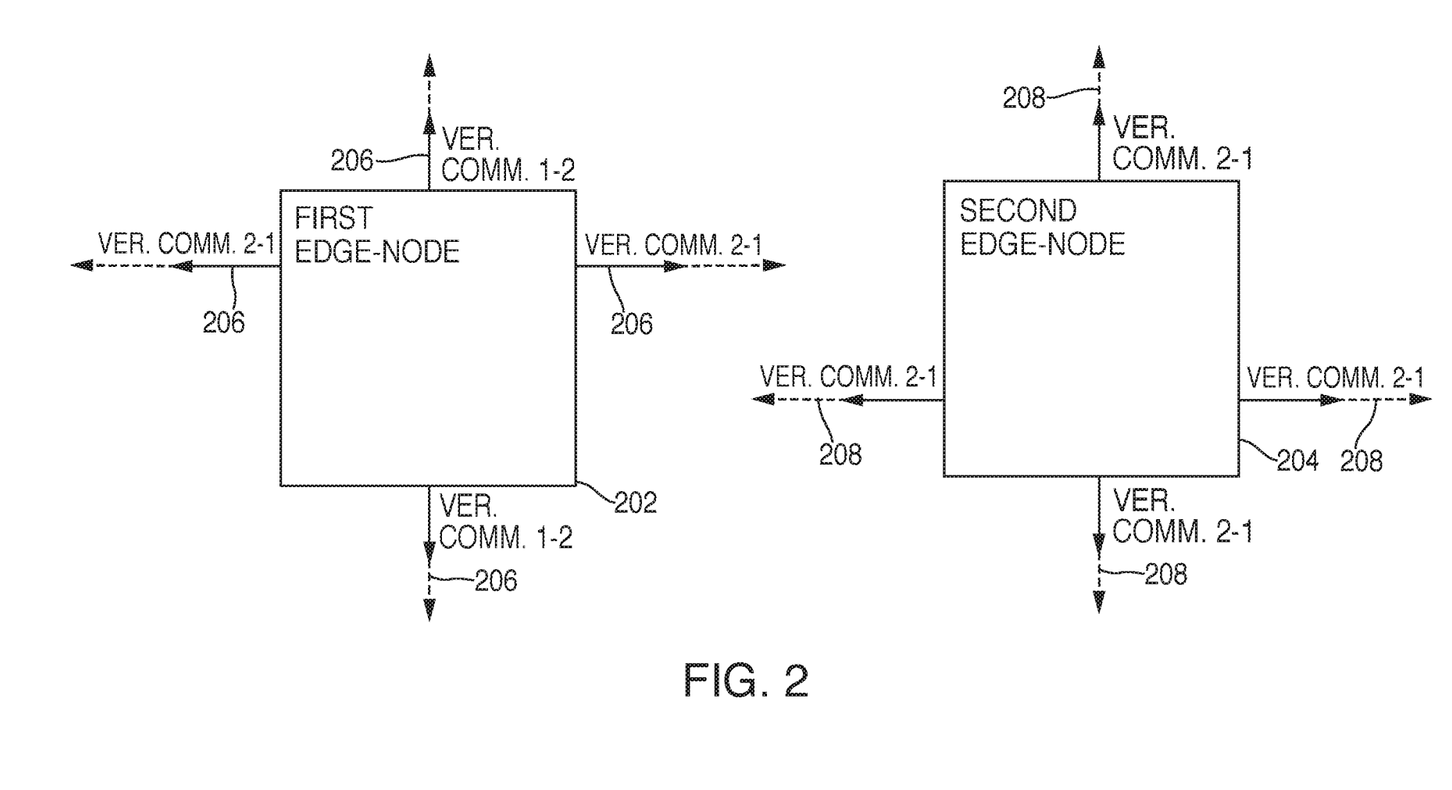
FIG. 2 shows another illustrative diagram in accordance with principles of the disclosure.

FIG. 2 shows an illustrative diagram. First edge-node 202 and second edge-node 204. First edge-node 202 and second edge-node 204 may have been previously paired. However, as shown in FIG. 2, the edge-nodes may have been separated more than a predetermined distance. The predetermined distance may be determined by pairing applications included within the edge-nodes.

It should be appreciated that first edge-node 202 is transmitting verification communication 206 in preferably all directions. However, first edge-node 202 may not be receiving a responsive communication. The same may be true for second edge-node 204. Second edge-node 204 is transmitting verification communication 208 in all directions. However, second edge-node 204 is not receiving responsive communications.

Figure 3:
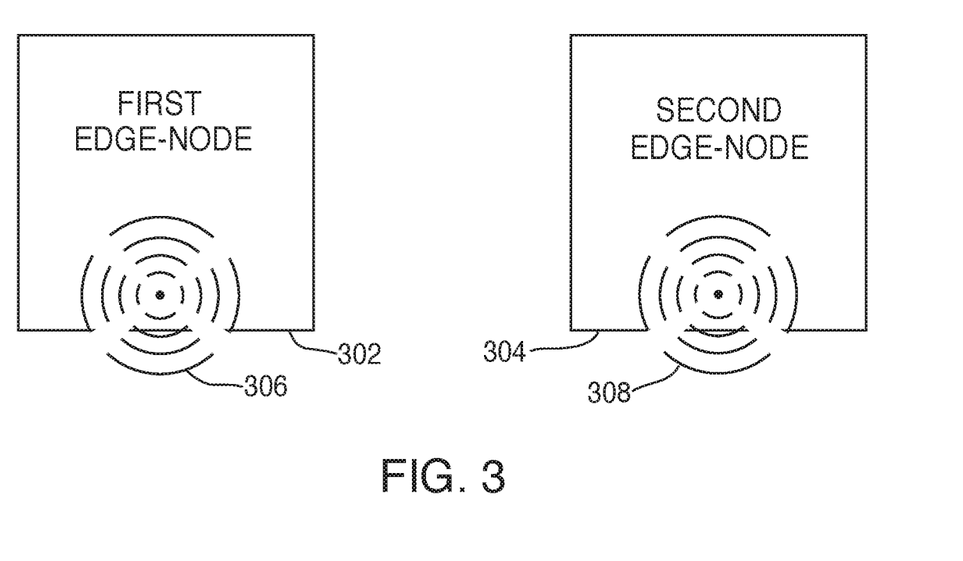
FIG. 3 shows yet another illustrative diagram in accordance with principles of the disclosure.

FIG. 3 shows an illustrative diagram. First edge-node 302 may transmit alert 306. Alert 306 may have been triggered in response to a failure to identify a previously paired edge-node. The alert may include data relating to the previously paired edge-node. Such data may include a name of the previously paired device, a picture of the previously paired device or any other suitable data.

Second edge-node 304 may transmit alert 308. Alert 308 may have been triggered in response to a failure to identify a previously paired edge-node.

It should be appreciated that it may be important for both edge-nodes included in a communication pair to identify the separation of the pair. This may be because in order to reestablish communication between the edge-nodes, it may be simple to locate both edge-nodes because of the alert on both of the edge-nodes.

Figure 4:
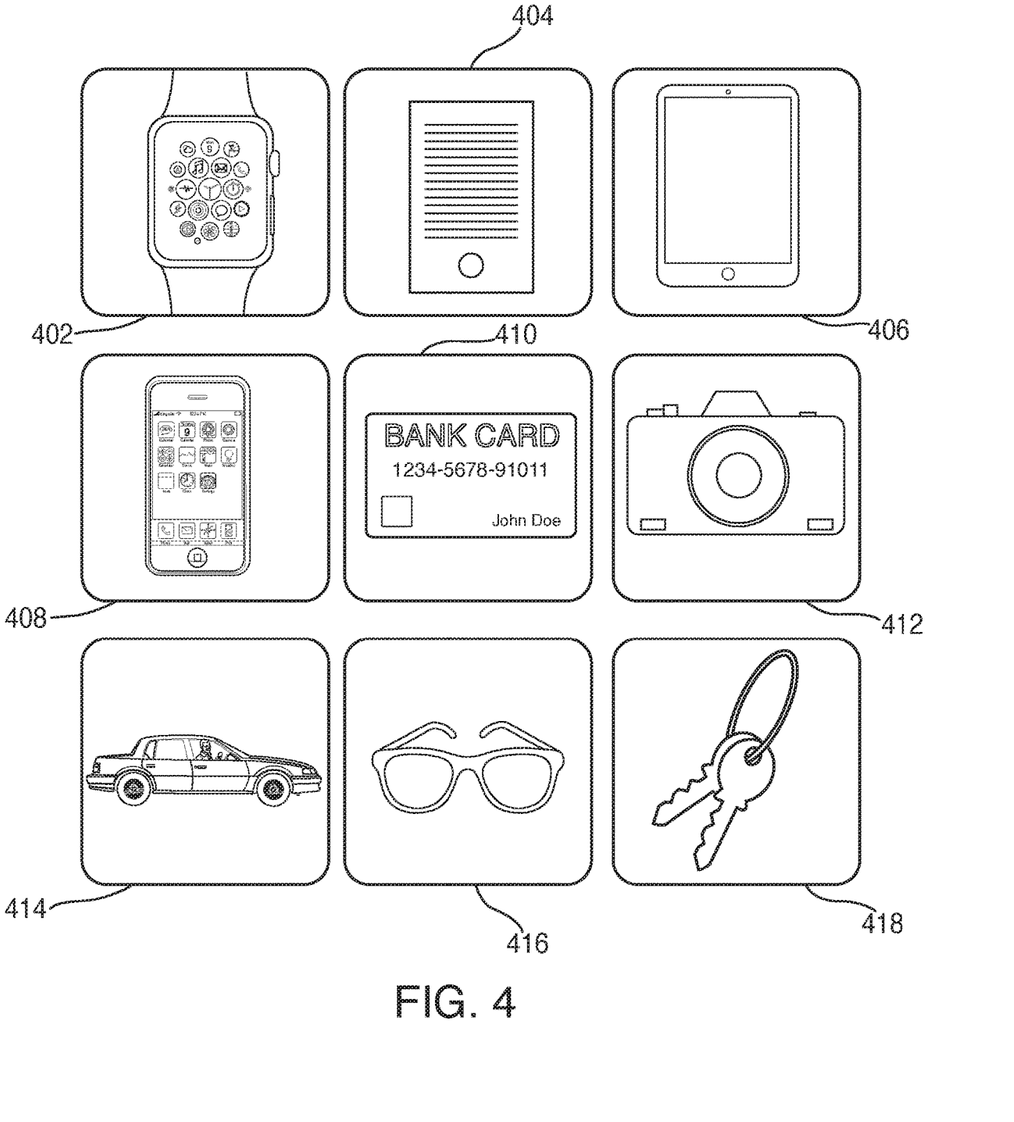
FIG. 4 shows still another illustrative diagram in accordance with principles of the disclosure.

FIG. 4 shows an illustrative network diagram. The network may include a plurality of edge-nodes. Each edge-node may include a smart sensor. The smart sensor may include an embedded sensor, a low-power microprocessor and communication capabilities.

The network may include edge-node 402. Edge-node 402 may be a smart watch. The smart watch may be associated with an entity. The entity may be a person. The smart watch may communicate with other edge-nodes in the network.

The network may include edge-node 404. Edge-node 404 may be a doorbell. The doorbell may be associated with an entity. The entity may be a house. The doorbell may communicate with other edge-nodes in the network.

The network may include edge-node 406. Edge-node 406 may be a tablet. The tablet may be associated with an entity. The entity may be a person. The tablet may communicate with other edge-nodes in the network.

The network may include edge-node 408. Edge-node 408 may be a mobile device. The mobile device may be associated with an entity. The entity may be a person. The mobile device may communicate with other edge-nodes in the network.

The network may include edge-node 410. Edge-node 410 may be a payment instrument. The payment instrument may be a credit card, debit card, bank card or other suitable payment instrument. The payment instrument may be associated with an entity. The entity may be a person. The entity may be an issuing bank. The payment instrument may communicate with other edge-nodes in the network.

The network may include edge-node 412. Edge-node 412 may be a security camera. The security camera may be associated with an entity. The entity may be a building. The security camera may communicate with other edge-nodes in the network.

The network may include edge-node 414. Edge-node 414 may be a car. The car may be associated with an entity. The entity may be a family. The car may communicate with other edge-nodes in the network.

The network may include edge-node 416. Edge-node 416 may be eye glasses. The eye glasses may be associated with an entity. The entity may be a person. The glasses may communicate with other edge-nodes in the network.

The network may include edge-node 418. Edge-node 418 may be keys. The keys may be associated an entity. The entity may be a car. The entity may be a person. The keys may communicate with the other edge-nodes in the network.

Figure 5:
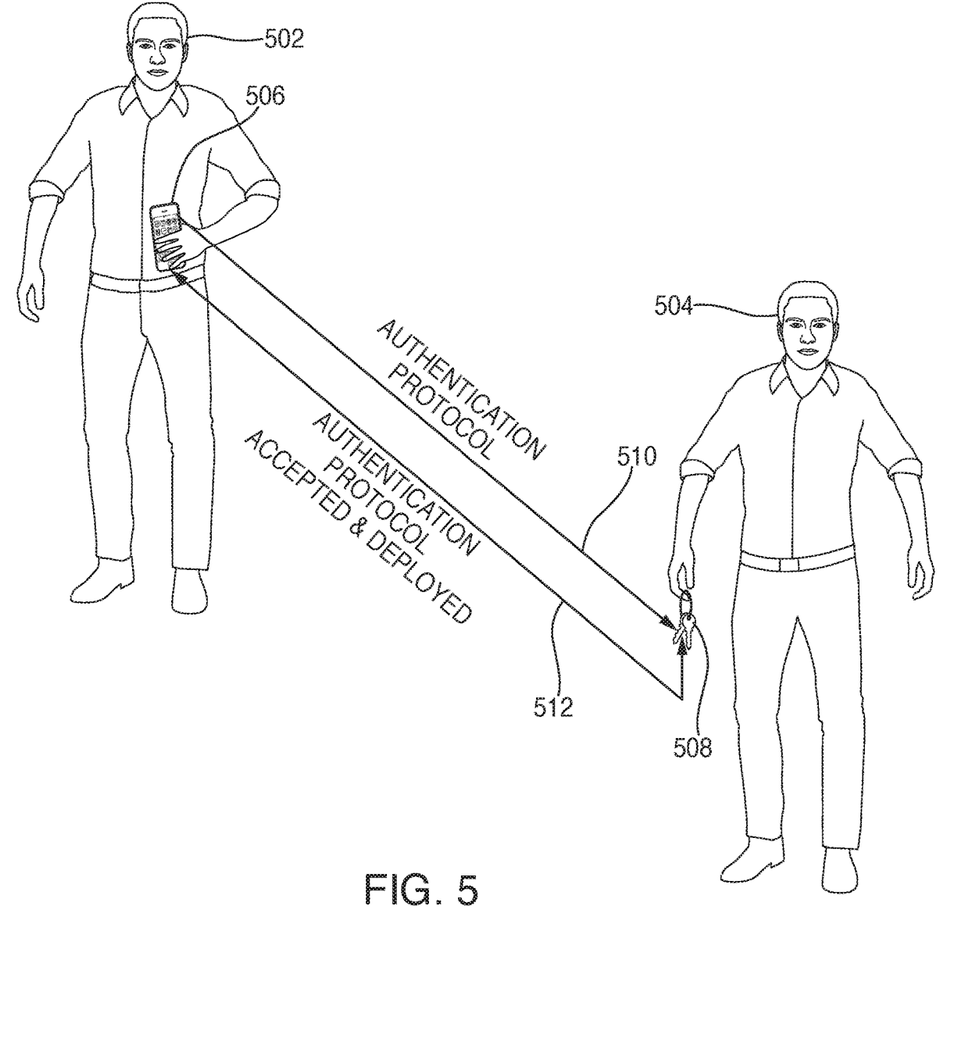
FIG. 5 shows yet another illustrative diagram in accordance with principles of the disclosure.

FIG. 5 shows an illustrative diagram. Person 502 may be associated with mobile device 506. Person 504 may be associated with keys 508.

Person 502 may initiate the transmission of an authentication protocol from mobile device 506 to keys 508, as shown at 510. The authentication protocol may include procedural details relating to how to communicate in an aggregated authentication. Such procedural details may include self-identifying data, what authentication data is being used and instructions for aggregating the data.

Communication 512 shows that keys 508 accepted and deployed the authentication protocol. Keys 508 may have accepted the authenticated protocol in response to an instruction from person 504.

Communication 512 was communicated back to mobile device 506. Communication 512 may inform mobile device 506 about the authentication protocol acceptance and deployment.

Figure 6:
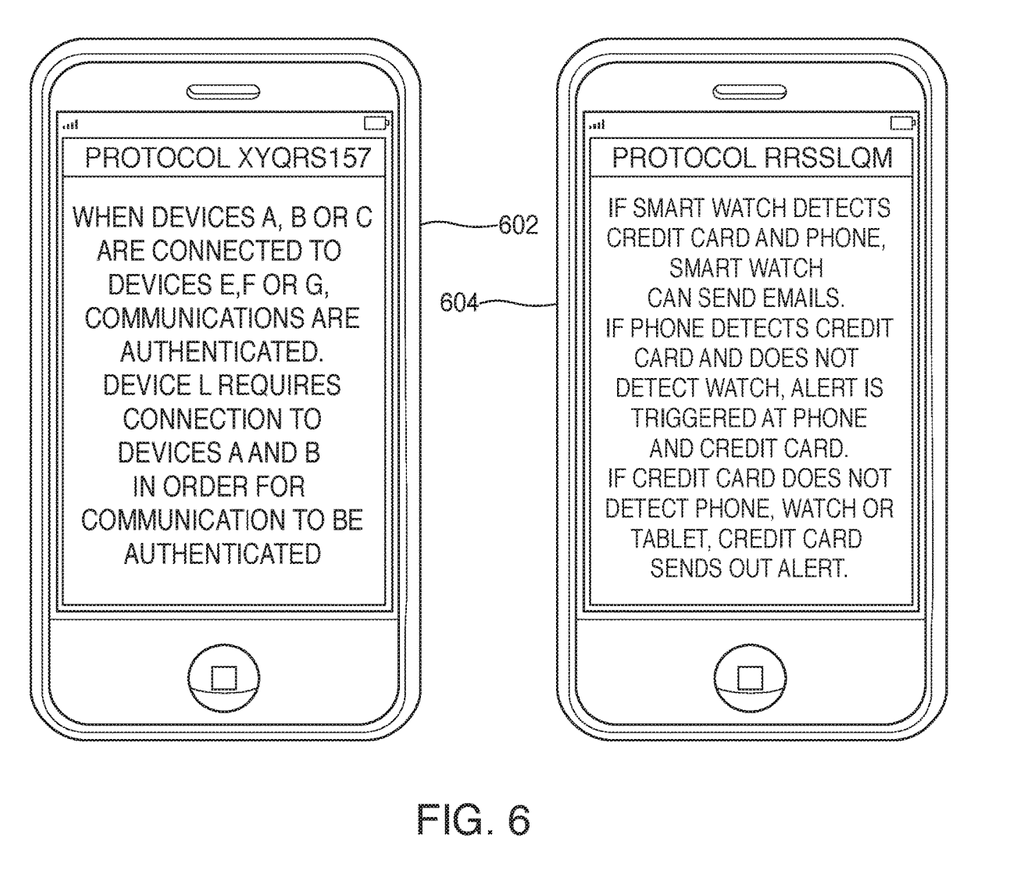
FIG. 6 shows still yet another illustrative diagram in accordance with principles of the disclosure.

FIG. 6 shows an illustrative diagram. The illustrative diagram may include two exemplary protocols. The protocols may be stored event protocols. The stored event protocols may instruct an edge-node what action to take in response to an event.

The first exemplary protocol may be protocol XYQRS157, shown at 602. Protocol XYQRS157 may be included on an edge-node. Protocol XYQRS157 may have been customized by an entity associated with the edge-node. Protocol XYQRS157 may state that when devices A, B or C are connected to devices E, F or G, communications are authenticated. Protocol XYQRS157 may state that device L requires connection to devices A and B in order for communications to be authenticated.

The second exemplary protocol may be protocol RRSSLQM, shown at 604. Protocol RRSSLQM may be included on an edge-node. Protocol RRSSLQM may be a standard protocol for the edge-node. Protocol RRSSLQM may be applied on multiple different edge-nodes. Protocol RRSSLQM may state that if a smart watch detects a credit card and a phone, the smart watch may be authenticated to transmit e-mail communications. Protocol RRSSLQM also states that if a phone detects a credit card and does not detect the smart watch, an alert is triggered at the phone and the credit card. Protocol RRSSLQM also states that if the credit card does not detect phone, watch or tablet, the credit card sends out an audible alert.

Figure 7:
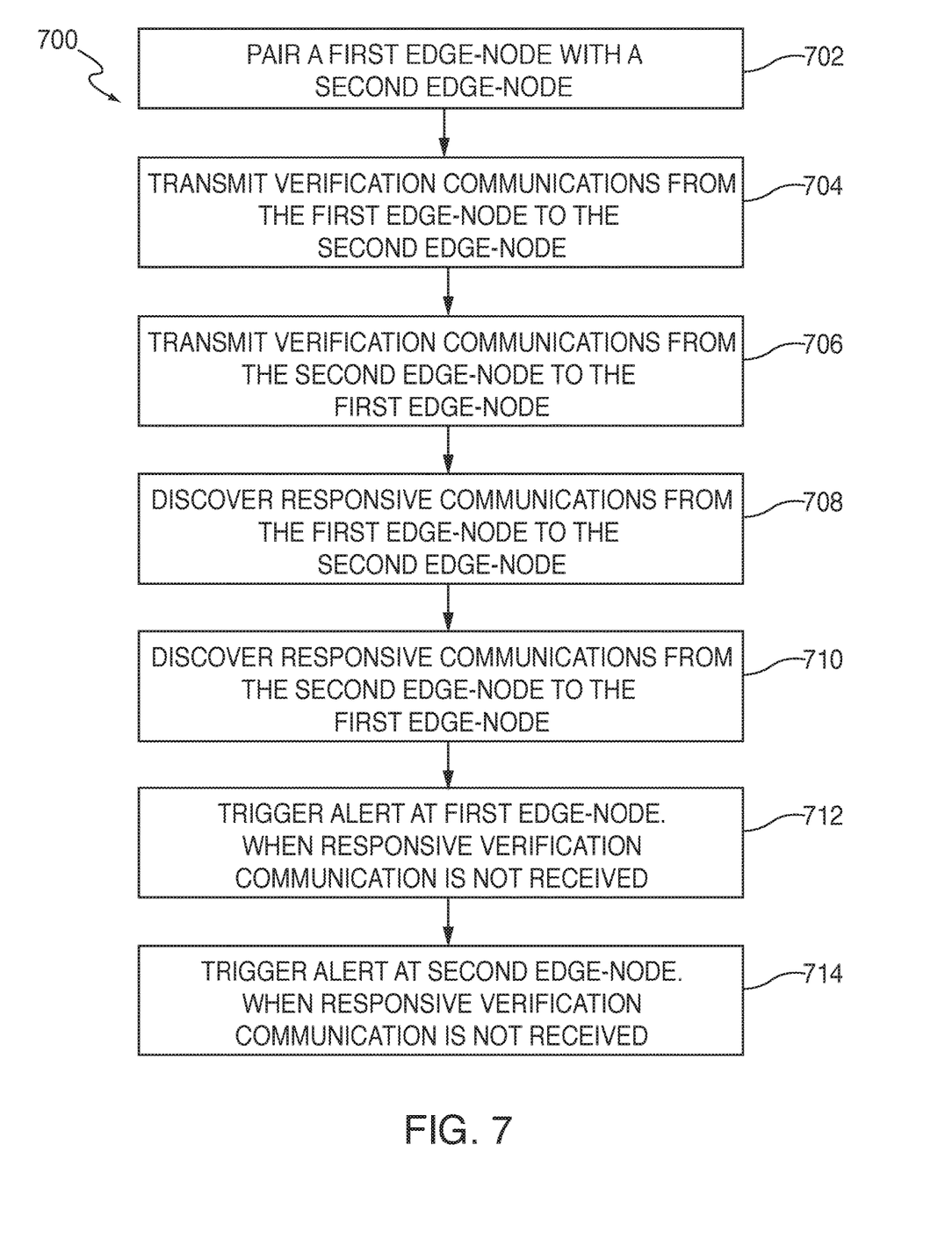
FIG. 7 shows an illustrative flow chart in accordance with principles of the disclosure.

FIG. 7 shows an illustrative flow chart. Step 702 shows pairing a first edge-node with a second edge-node. Step 704 shows transmitting verification communications from the first edge-node to the second edge-node.

Step 706 shows transmitting verification communications from the second edge-node to the first edge-node. Step 708 shows discovering responsive verification communications from the first edge-node. The discovering may occur at the second edge-node.

Step 710 shows discovering responsive verification communication from the second edge-node. The discovering may occur at the first edge-node.

Step 712 shows triggering an alert at the first edge-node when a responsive verification communication is not received at the first edge-node. Step 714 shows triggering an alert at the second edge-node when a responsive verification communication is not received at the second-edge-node.

Thus, an edge-node authentication-data exchange system is provided. Persons skilled in the art will appreciate that the present invention can be practiced by other than the described embodiments, which are presented for purposes of illustration rather than of limitation. The present invention is limited only by the claims that follow.

What is claimed is:

1. A method for exchanging authentication data between edge-nodes, the method comprising:
    pairing a first edge-node with a second edge-node, said first edge-node and said second edge-node being included in an internet of things ("IoT") network, said IoT network being associated with a single user entity;
    periodically transmitting a verification communication from the first edge-node to the second edge-node;
    discovering a responsive verification communication at the first edge-node from the second edge-node;
    when the second edge-node is unresponsive, for a predetermined time period, to the verification communication transmitted by the first edge-node, triggering an alert at the first edge-node;
    periodically transmitting a verification communication from the second edge-node to the first edge-node;
    discovering a responsive verification communication at the second edge-node from the first edge-node;
    when the first edge-node is unresponsive, for a predetermined time period, to the verification communication transmitted by the second edge-node, triggering an alert at the second edge-node, said alert identifying an event occurring at the first edge node;
    analyzing, by the second edge node, a stored event protocol, said protocol comprising an algorithm for implementing one or more executables in response to the occurring of the identified event, said protocol being modifiable by the single user entity;
    identifying an executable from the one or more executables; and
    executing the executable.

2. The method of claim 1, further comprising transmitting a verification communication from the first edge-node to the second edge-node is response to receipt of an authentication request at the first edge-node.

3. The method of claim 1, wherein the alert at the first edge-node is an audible alert.

4. The method of claim 1, wherein the alert at the second edge-node is an audible alert.

5. The method of claim 1, wherein, when the responsive verification communication is received within the predetermined time period, the responsive verification communication authenticates an entity associated with the first edge-node.

6. The method of claim 5, wherein the entity is associated with the first edge-node and the second edge-node.

7. The method of claim 5, wherein the authenticated entity is enabled to access authenticated applications within the first edge-node.

8. The method of claim 5, wherein the authenticated entity is enabled to transmit authenticated communications from the first edge-node.

9. The method of claim 5, wherein upon the triggering the alert at the first edge-node, authenticated applications and authenticated communications on the first edge-node become unavailable until the entity is re-authenticated.

10. A system for exchanging authentication data between edge-nodes, the system comprising:
    an edge-node network, the edge-node network comprising a plurality of edge-nodes, the edge-node network is an internet of things ("IoT") network associated with a single user entity, each edge-node comprising:
        a pairing module, each pairing module being operable to:
            receive an instruction to pair a host edge-node with one or more edge-nodes in the network;
            pair the host edge-node with the one or more edge-nodes in the network;
            continually transmit, from the host edge-node, a verification communication, to the one or more edge-nodes in the network;
            continually discover, at the host edge-node, a responsive verification communication, from the one or more edge-nodes in the network; and
            continually receive, at the host edge-node, the responsive verification communication, from the one or more edge-nodes in the network;
        an executable module, each executable module being operable to:
            determine occurrence of an event;
            upon determination of the occurrence of the event, analyze a stored event protocol of the host edge-node, the stored event protocol modifiable by the single user entity, the stored event protocol for use with a list of paired edge-nodes, said protocol comprising an algorithm for implementing one or more executables in response to the occurrence of the determined event;
            based on the algorithm, determine an executable; and
            execute the determined executable.

11. The system of claim 10, wherein the one or more executables comprise:
    activating an alert;
    authenticating an edge-node; and
    terminating authentication of an edge-node.

12. The system of claim 11, wherein the alert in an audible alert.

13. The system of claim 11, wherein the authenticating the edge-node enables transmission of authenticated communications.

14. The system of claim 11, wherein the authenticating the edge-node enables access to authenticated applications.

15. The system of claim 11, wherein terminating authentication of an edge-node comprises terminating transmission of authenticated communications and terminating access to authenticated applications.

16. The system of claim 10, wherein the determined event comprises:
    a pairing between the host edge-node and another edge-node;

a receipt of an authentication request at the host edge-node; and/or an unresponsive edge-node, said unresponsive edge-node being unresponsive for a predetermined amount of time, to a verification communication transmitted by the host edge-node.

17. The system of claim 10, wherein the stored event protocol is standardized.

18. The system of claim 10, wherein the network is associated with a plurality of entities.

* * * * *